# United States Patent
Kairali et al.

(10) Patent No.: US 12,470,624 B2
(45) Date of Patent: Nov. 11, 2025

(54) SMART LOG SHIPPING IN A HETEROGENOUS CLOUD COMPUTING ENVIRONMENT

(71) Applicant: International Business Machines Corporation, Armonk, NY (US)

(72) Inventors: Sudheesh S. Kairali, Kozhikode (IN); Satyam Jakkula, Bengaluru (IN); Sudhanshu Sekher Sar, Bangalore (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/472,104

(22) Filed: Sep. 21, 2023

(65) Prior Publication Data

US 2025/0106282 A1  Mar. 27, 2025

(51) Int. Cl.
*H04L 67/1095* (2022.01)
(52) U.S. Cl.
CPC ................. *H04L 67/1095* (2013.01)
(58) Field of Classification Search
CPC .................................... H04L 67/1095
USPC ........................................... 709/217
See application file for complete search history.

(56) References Cited

U.S. PATENT DOCUMENTS

| 8,848,608 | B1* | 9/2014 | Addepalli | H04W 8/26 370/401 |
| 12,309,236 | B1* | 5/2025 | Frazier, Jr. | G06F 16/9535 |
| 2005/0114730 | A1* | 5/2005 | Iwamura | G06F 11/2074 714/13 |
| 2016/0135242 | A1* | 5/2016 | Hampel | H04W 76/14 370/329 |
| 2022/0129303 | A1* | 4/2022 | Wang | G06F 11/2028 |
| 2023/0046309 | A1* | 2/2023 | May | G08G 5/26 |
| 2024/0028414 | A1* | 1/2024 | Vasanad | H04L 9/3213 |

FOREIGN PATENT DOCUMENTS

| CN | 112087490 A | | 12/2020 |
| CN | 113873000 A | * | 12/2021 |
| CN | 115580530 A | * | 1/2023 |

(Continued)

OTHER PUBLICATIONS

Changjong Kim and Sunggon Kim, Optimizing Logging and Monitoring in Heterogeneous Cloud Environments for IoT and Edge Applications, Publisher: IEEE, DOI: 10.1109/JIOT.2023.3303373, pp. 22611-22622, Data of Publication: Aug. 11, 2023.*

(Continued)

*Primary Examiner* — Wing F Chan
*Assistant Examiner* — John Fan
(74) *Attorney, Agent, or Firm* — Anthony M. Pallone

(57) ABSTRACT

A method, computer program product, and computer system are provided for smart log shipping in a heterogeneous computing environment. A first edge device and a second edge device in a heterogeneous cloud computing environment are identified. The first edge device is caused to transmit collected log data associated with the first edge device to the second edge device based on a lack of network connectivity between the first edge device and a cloud data center. The transmitted collected log data is received from the second edge device.

17 Claims, 4 Drawing Sheets

(56) References Cited

FOREIGN PATENT DOCUMENTS

CN 115801562 A 3/2023

OTHER PUBLICATIONS

"Cloud Logging", Google Cloud, Printed Jun. 29, 2023, 13 pages, <https://cloud.google.com/logging>.
Klein, Charlie, "A Quick Guide to Log Shipping To Logz.io: Collectors, Code, and Clouds", logz.io, Printed Jun. 29, 2023, 13 pages, <https://logz.io/blog/guide-log-shipping-from-code-cloud/>.

* cited by examiner

SMART LOG SHIPPING IN A HETEROGENOUS CLOUD COMPUTING ENVIRONMENT

FIELD

This disclosure relates generally to the field of cloud computing, and more particularly to log shipping.

BACKGROUND

Log shipping is the process of automating the backup of transaction log files on a primary (production) database server, and then restoring them onto a standby server. Similar to replication, the primary purpose of log shipping is to increase database availability by maintaining a backup server that can replace a production server quickly.

SUMMARY

Embodiments relate to a method, system, and computer program product for smart log shipping in a heterogeneous computing environment. According to one aspect, a method for smart log shipping in a heterogeneous computing environment is provided. The method may include identifying a first edge device and a second edge device in a heterogeneous cloud computing environment. The first edge device is caused to transmit collected log data associated with the first edge device to the second edge device based on a lack of network connectivity between the first edge device and a cloud data center. The transmitted collected log data is received from the second edge device.

According to another aspect, a computer system for smart log shipping in a heterogeneous computing environment is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying a first edge device and a second edge device in a heterogeneous cloud computing environment. The first edge device is caused to transmit collected log data associated with the first edge device to the second edge device based on a lack of network connectivity between the first edge device and a cloud data center. The transmitted collected log data is received from the second edge device.

According to yet another aspect, a computer program product for smart log shipping in a heterogeneous computing environment is provided. The computer program product may include one or more computer-readable storage devices and program instructions stored on at least one of the one or more tangible storage devices, the program instructions executable by a processor. The program instructions are executable by a processor for performing a method that may accordingly include identifying a first edge device and a second edge device in a heterogeneous cloud computing environment. The first edge device is caused to transmit collected log data associated with the first edge device to the second edge device based on a lack of network connectivity between the first edge device and a cloud data center. The transmitted collected log data is received from the second edge device.

According to one or more aspects, the collected log data is caused to be transmitted from the first edge device to the second edge device based on the first edge device or the second edge device moving from a first location to a second location. This may allow for transmission of logs based on the possibility of a device later moving to or past an area with network connectivity.

According to one or more aspects, the method may further include causing the first edge device to change a mode of operation based on the first edge device being within a connectivity range to the second edge device. This may allow for logs to be shipped immediately upon detection of a suitable network connection.

According to one or more aspects, causing the first edge device to transmit the collected log data to the second edge device comprises relaying the collected log data through a third edge device based on a lack of network connectivity between the first edge device and the second edge device. This may allow for improved connectivity for the shipment of logs to the data center.

According to one or more aspects, the method may further include causing the first edge device to identify a relevant portion of the collected log data, transmitting the identified relevant portion of the collected log data to the cloud data center or the second edge device, and retaining a remaining portion of the collected log data for transmission at a later time. This may allow for shipping of the most important logs first while allowing for shipping of less important logs at a later time.

According to one or more aspects, the first edge device is a far edge device and the second edge device is a near edge device. This may allow for support log shipping in a heterogenous computing environment, especially a hybrid cloud environment.

According to one or more aspects, the first edge device and the second edge device correspond to one or more from among a mobile device, a smartphone, a personal computer, a tablet computer, an Internet of Things device, and a motor vehicle. This may allow for the embodiments disclosed to be used in a variety of devices.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
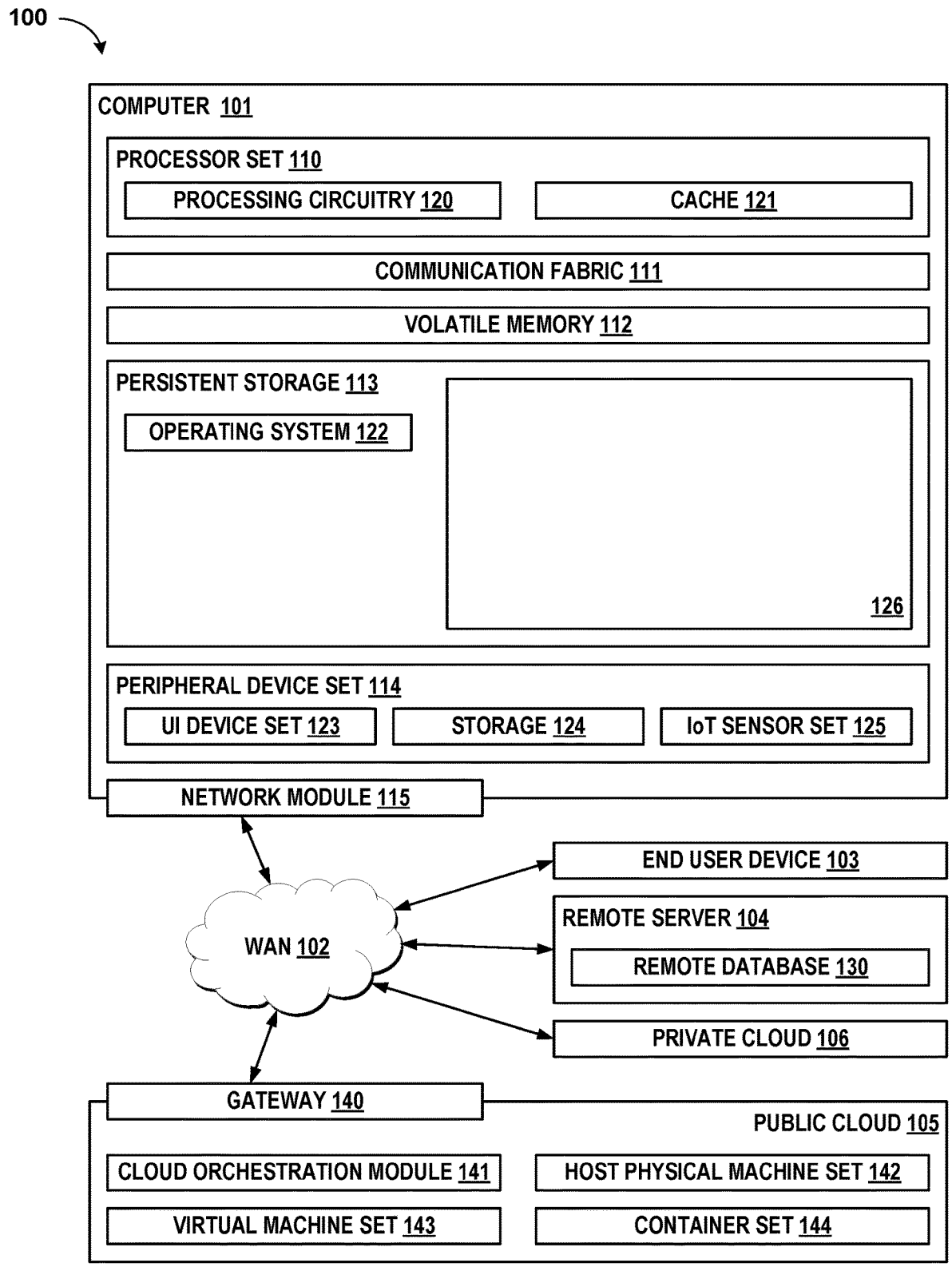
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of cloud computing, and more particularly to log shipping. The following described exemplary embodiments provide a system, method, and computer program product to, among other things, provide for smart log shipping in a heterogenous computing environment. Therefore, some embodiments have the capacity to improve the field of computing by allowing for transmission of large quantities of log data from an edge device to a cloud data center based on connectivity and resources of another edge device.

As previously described, log shipping is the process of automating the backup of transaction log files on a primary (production) database server, and then restoring them onto a standby server. Similar to replication, the primary purpose of log shipping is to increase database availability by maintaining a backup server that can replace a production server quickly.

One of the primary objectives of the heterogenous computing is to process the data as early as possible at far edges/nodes so large quantities of raw data may not need to be sent over a communications network. In some cases, heterogenous computing environments may need log analysis and similar capabilities at a centralized place so as to analyze a cloud level failure. However, all the far devices/nodes may not be in a position to upload the logs directly to a network which may really impact the functional network bandwidth. It may be advantageous, therefore, to extend the traditional cloud-centric heterogeneous computing architecture to use the capabilities of other edge devices in the network.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method and computer program product that performs smart log shipping in a heterogeneous computing environment. Referring now to FIG. 1, Computing environment 100 contains an example of an environment for the execution of at least some of the computer code involved in performing the inventive methods, such as Smart Log Shipping Program 126. In addition to Smart Log Shipping Program 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Smart Log Shipping Program 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Smart Log Shipping 126 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Smart Log Shipping 126 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
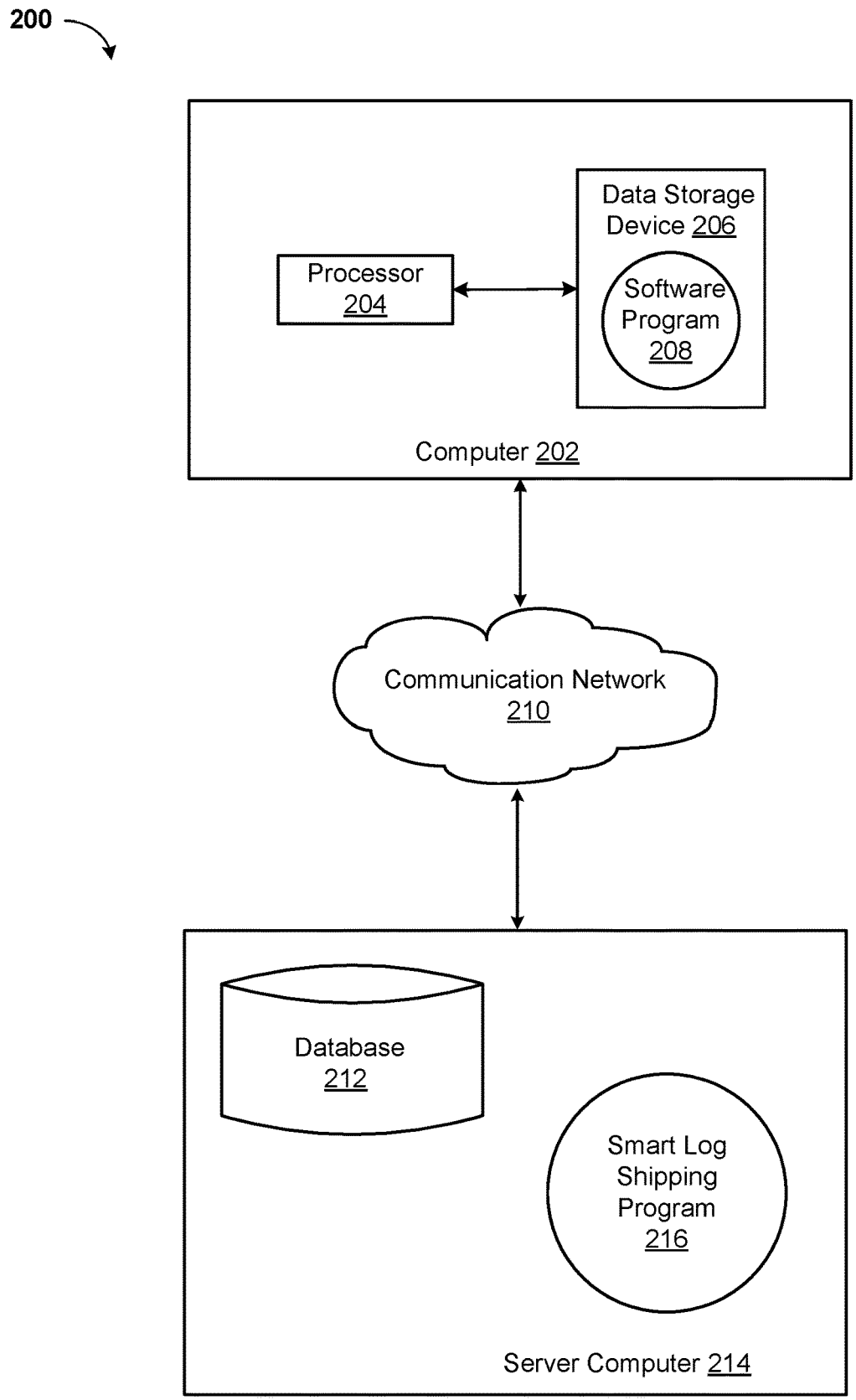
FIG. 2 illustrates a networked computer environment according to at least one embodiment.

Referring now to FIG. 2, a functional block diagram of a networked computer environment illustrating a log shipping system 200 (hereinafter "system") for smart log shipping in a heterogeneous computing environment is depicted according to one or more embodiments. It should be appreciated that FIG. 2 provides only an illustration of one implementation and does not imply any limitations with regard to the environments in which different embodiments may be implemented. Many modifications to the depicted environments may be made based on design and implementation requirements.

The system 200 may include a computer 202 and a server computer 214. The computer 202 may communicate with the server computer 214 via a communication network 210 (hereinafter "network"). The computer 202 may include a processor 204 and a software program 208 that is stored on a data storage device 206 and is enabled to interface with a user and communicate with the server computer 214. The computer 202 may be, for example, a mobile device, a telephone, a personal digital assistant, a netbook, a laptop computer, a tablet computer, a desktop computer, or any type of computing devices capable of running a program, accessing a network, and accessing a database.

The server computer 214, which may be used for log shipping in a heterogenous computing environment is enabled to run a Smart Log Shipping Program 216 (hereinafter "program") that may interact with a database 212. The Smart Log Shipping Program is explained in more detail below with respect to FIG. 4. In one embodiment, the computer 202 may operate as an input device including a user interface while the program 216 may run primarily on server computer 214. In an alternative embodiment, the program 216 may run primarily on one or more computers 202 while the server computer 214 may be used for processing and storage of data used by the program 216. It should be noted that the program 216 may be a standalone program or may be integrated into a larger smart log shipping program.

It should be noted, however, that processing for the program 216 may, in some instances be shared amongst the computers 202 and the server computers 214 in any ratio. In another embodiment, the program 216 may operate on more than one computer, server computer, or some combination of computers and server computers, for example, a plurality of computers 202 communicating across the network 210 with a single server computer 214. In another embodiment, for example, the program 216 may operate on a plurality of server computers 214 communicating across the network 210 with a plurality of client computers. Alternatively, the program may operate on a network server communicating across the network with a server and a plurality of client computers.

The network 210 may include wired connections, wireless connections, fiber optic connections, or some combination thereof. In general, the network 210 can be any combination of connections and protocols that will support communications between the computer 202 and the server computer 214. The network 210 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a private network, an ad hoc network, an intranet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
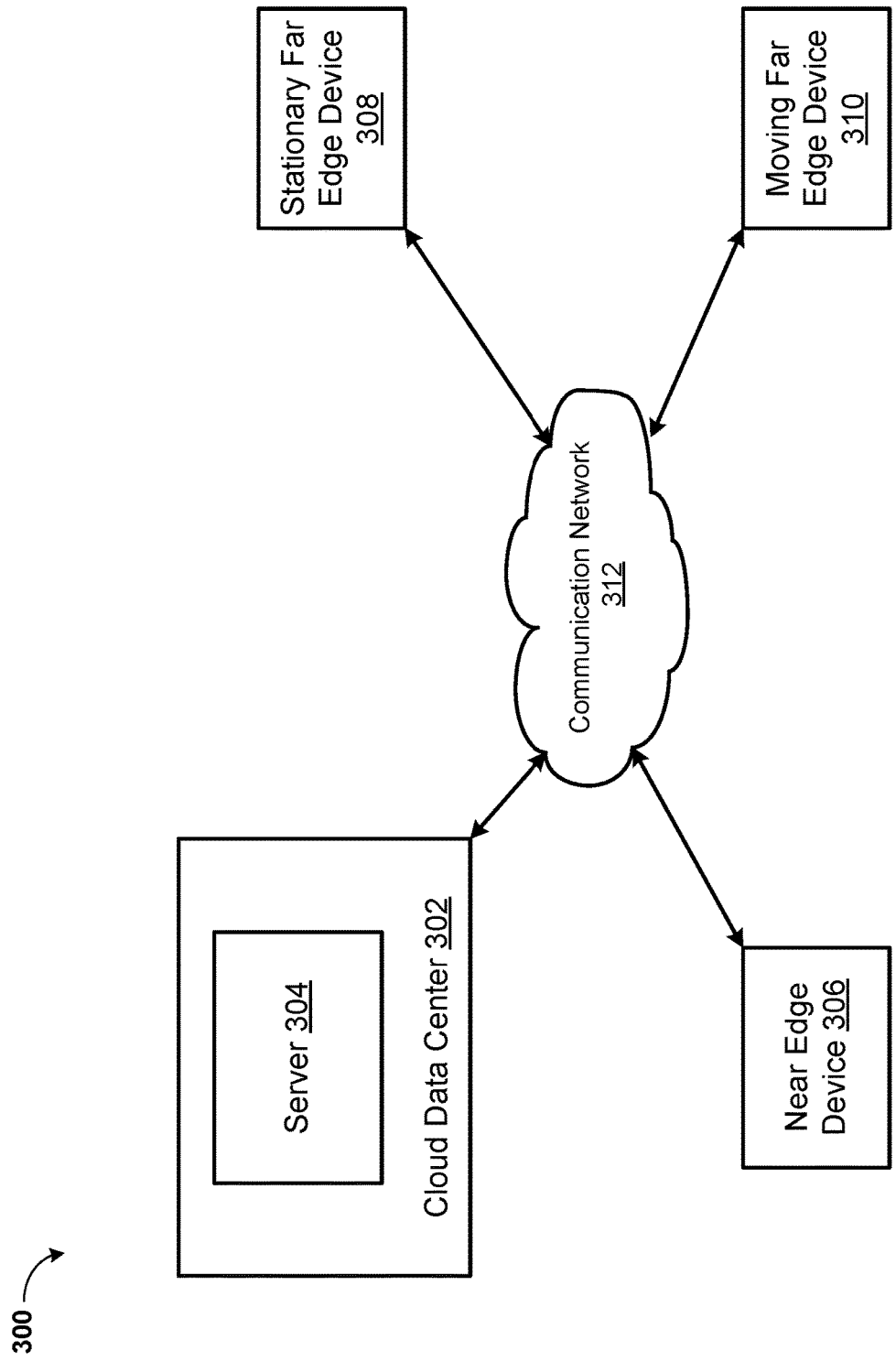
FIG. 3 is a block diagram of a system for smart log shipping in a heterogeneous computing environment, according to at least one embodiment.

Referring now to FIG. 3, a block diagram of a log shipping system 300 is depicted according to one or more embodiments. The log shipping system 300 may include, among other things, a cloud data center 302, a server 304, a near edge device 306, a stationary far edge device 308, a moving far edge device 310, and a communications network 312. For ease of description, only one of each device type is depicted. However, it may be appreciated that the log shipping system may include any number of servers 304, near edge devices 306, stationary far edge devices 308, moving far edge devices 310, and communications networks 312. The near edge devices 306, the stationary far edge devices 308, and the moving far edge devices 310 may include substantially any device that may function as an edge device, such as a mobile device, a smartphone, a personal computer, a tablet computer, an Internet of Things device, and a motor vehicle.

The cloud data center 302 may include one or more servers 304 at a given physical location. The cloud data center 302 may identify near cloud capacities of the near edge devices 306 and far cloud capacities of the stationary far edge devices 308 and the moving far edge devices 310 based on network connectivity and upload and download capabilities.

The server 304 may substantially correspond to the server computer 214 depicted in FIG. 2. The server 304 may identify near devices (i.e., the near edge device 306) and far devices (i.e., the stationary far edge device 308 and the moving far edge device 310) based on the network capabilities, including reachability, availability, upload and download capability, locality, and mobility. The server 304 may identify any near and far device which is participating in log analysis capabilities. Each gateway or computing environment will have a classification (i.e., far or near), and the cloud service will keep track of these parameters.

The server 304 may also track network usage required by each far device for shipping logs based on quantity of logs and network quality and reachability. In some cases, the cloud service on the server 304 can identify that a far device is consuming too much bandwidth for logs based on network parameters. The cloud service will continuously monitor and identify mobility patterns of far devices and may identify cases where the moving far edge device 310 can fetch logs from multiple weak far devices that may need to send logs to the cloud, but the network is weak. In such cases, the moving far edge device 310 will fetch all logs from such neighbors based on route map. The moving far edge device 310 can offload these logs to the near device 306 or the cloud service on the server 304 itself based on network and route map.

Every cloud computing environment will have devices, nodes, and capacities that are located a far distance from the cloud data center in terms of locality and availability and reachability of network, such as devices that may be hundreds or thousands of miles away from a cloud data center. It may be appreciated that the near edge devices 306, by virtue of their relatively close proximity to the cloud data center 302 compared to far edge devices may be able to afford to fetch fixes as currency downloads without affecting their operations. The near edge devices 306 may be, for example, located a distance in which latency to the cloud data center may be measured in microseconds or less while the stationary far edge devices 308 and moving far edge devices 310 may be located a distance in which latency to the cloud data center 302 may be measure in milliseconds or greater. A server 304 from among the servers 304 may identify the population of stationary far edge devices 308 and moving far edge devices 310 that are taking part in the log analysis process.

The log shipping system 300 may also allow for mobility pattern-based log shipping. For example, a server 304 may identify the cloud capacities that are mobile, such as a moving far edge device 310, and may identify the current location and direction in which the moving far edge device 310 is traveling. If the moving far edge device 310 is moving towards another far edge device, such a stationary far edge device 308, a server 304 in the cloud data center 302 may alert both far edge devices so that the logs that are stored in the stationary far edge device 308 can be offloaded to the moving far device 310, which may eventually move closer in proximity to a near device 306 or the cloud data center 302, which will allow the logs of the stationary far edge device 310 to be uploaded to a cloud log analysis service.

The log shipping system 300 may also allow for friendly neighbor-based log shipping. For example, a server 304 may identify the far edge devices and near edge devices that can contact each other. In cases where far edge devices may need to ship logs to a log analysis service but the network is slow and where near edge devices 306 have network bandwidth to send more data (e.g., after functional usage of the network bandwidth by the near edge devices 306), the log shipping system 300 may alert both devices as to whether a far edge device has other means to reach the near edge device (such as radio transmission, wireless connectivity, local network) and whether the far edge device can pass on logs to the friendly neighbor (i.e., near edge device) for exchange to the log analysis service/server. For each exchange, a far edge device may be able to sell computational capacity to a near edge device.

The log shipping system 300 may also relay logs in a heterogeneous computing environment. For example, if a first stationary far edge device 308 needs to ship its logs and a second stationary far edge device 308 has network connectivity, the first stationary far edge device 308 can pass the logs to the moving far edge device 310, which can, in turn, pass the logs to the second stationary far edge device 308 based on connectivity and reachability. Thus, if a first device needs to ship logs and a second device has network connectivity, the first device can pass logs to a second device that can relay the logs to a third device.

The log shipping system 300 may also allow for bulk log loading onto a mobile device. For example, a car that serves as a far-moving computational device (i.e., moving far edge device 310) that may interact with a cloud provider and may identify all the stationary far devices 308 that may need to ship logs. Thus, the car may upload logs from a plurality of far edge devices along the route of the moving car based on storage capacity or other considerations. Mobile devices may offload these logs based on mobility patterns to a cloud service or a near device.

The log shipping system 300 may also allow for log level changes based on shipping possibility. For example, the stationary far edge device 308 may be running in a given mode. However, if a moving far edge device 310 is nearby and available to ship large quantities of logs, the stationary far edge device 308 may transition to a different operating mode or level (e.g., debugging mode) based on a route map and available computing and network resources of the moving far edge device 310. Thus, if a first device is running information collection when a second, mobile device comes within range, the second device may be available to ship large quantity of logs, and the first device may move to a debugging level based on the second device's available time and route map.

The log shipping system 300 may also allow for fast forwarding of relevant logs based on network availability. For example, a moving far edge device 310 may be classified as a far device because of its network weakness. As the moving far edge device 310 moves, the network connection may become stronger and the moving far edge device 310 may become an available device to the server 304 and may need to ship ten terabytes of logs. The moving far edge device 310 may send the most relevant terabyte of logs, such as the latest logs of last day, to the server 304 over the communication network 312. The remaining nine terabytes may be sent via any of the above methods at a later time. Thus, the logs may not need to be sent at once, and devices and nodes may send relevant logs only when the communication network 312 has bandwidth and not much other data (e.g., functional data) to send.

Figure 4:
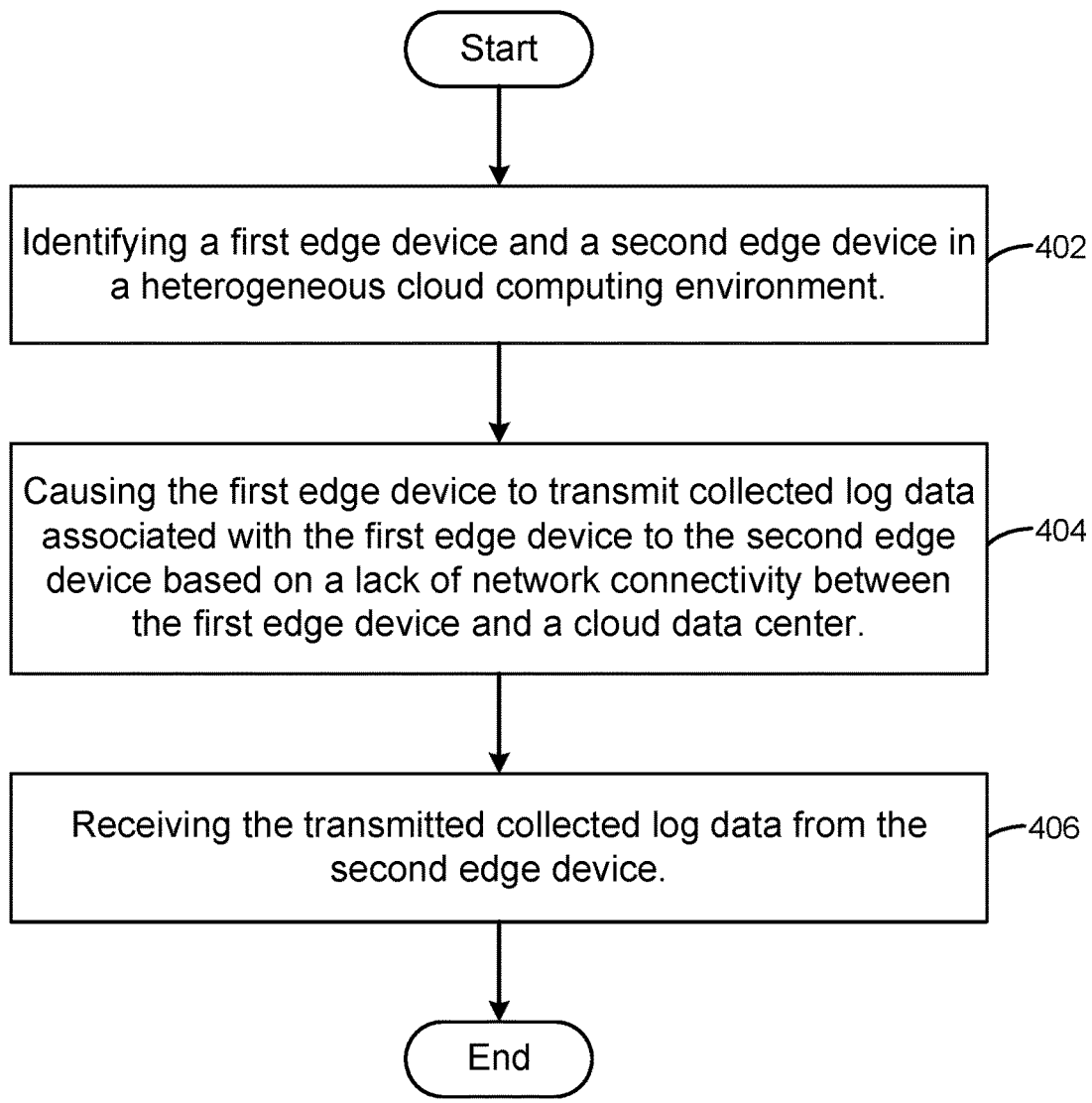
FIG. 4 is an operational flowchart illustrating the steps carried out by a program that performs smart log shipping in a heterogeneous computing environment, according to at least one embodiment.

Referring now to FIG. 4, an operational flowchart illustrating the steps of a method 400 carried out by a program (e.g., program 216) that performs smart log shipping in a heterogeneous computing environment is depicted. The method 400 may be described with the aid of the exemplary embodiments of FIGS. 1-3.

At 402, the method 400 may include identifying a first edge device and a second edge device in a heterogeneous cloud computing environment. According to one or more embodiments, the first edge device is a far edge device and the second edge device is a near edge device. The first edge device and the second edge device correspond to one or more from among a mobile device, a smartphone, a personal computer, a tablet computer, an Internet of Things device, and a motor vehicle. In operation, the server 304 (FIG. 3) in the cloud data center 302 (FIG. 3) may identify the near edge device 306 (FIG. 3), the stationary far edge device 308 (FIG. 3) and the moving far edge device 310 (FIG. 3) connected over the communication network 312 (FIG. 3) with various signal strengths.

At 404, the method 400 may include causing the first edge device to transmit collected log data associated with the first edge device to the second edge device based on a lack of network connectivity between the first edge device and a cloud data center. The data may be caused to be transmitted from the first edge device to the second edge device based on the first edge device or the second edge device moving from a first location to a second location. The first edge device may be caused to change a mode of operation based on the first edge device being within a connectivity range to the second edge device. The first edge device may be caused to transmit the collected log data to the second edge device by relaying the collected log data through a third edge device based on a lack of network connectivity between the first edge device and the second edge device. In operation, the server 304 (FIG. 3) may identify the stationary far edge device 308 (FIG. 3) as being in an area with weak connectivity to the communication network 312 (FIG. 3) and may identify the moving far edge device 310 (FIG. 3) as moving toward the stationary far edge device 308. The server 304 may cause the stationary far edge device to transmit its logs to the moving far edge device 310. The moving far edge device 310 may, depending on network conditions, transmit the logs directly to the server 304 or may relay through the near edge device 306 (FIG. 3).

At 406, the method 400 may include receiving the transmitted collected log data from the second edge device. The data may be the full logs or may be a relevant portion of the collected log data identified by the first edge device. The identified relevant portion of the collected log data may be transmitted to the cloud data center or the second edge device, and the remaining portion of the collected log data may be retained for transmission at a later time. In operation, the stationary far edge device 310 (FIG. 3) may identify important portions of the log data. The server 304 (FIG. 3) may either receive the full log files or a relevant portion of the logs. If the latter, the remaining logs may remain on the stationary far edge device 308 until conditions on the communication network 312 are optimal for sending the remaining logs.

It may be appreciated that FIG. 4 provides only an illustration of one implementation and does not imply any limitations with regard to how different embodiments may be implemented. Many modifications to the depicted environments may be made based on design and implementation requirements.

Some embodiments may relate to a system, a method, and/or a computer program product at any possible technical detail level of integration. The computer program product may include a computer-readable storage medium (or media) having computer readable program instructions thereon for causing a processor to carry out operations.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer program product may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of smart log shipping in a heterogeneous computing environment, executable by a processor, comprising:
    identifying a first edge device, a second edge device, and a third edge device in a heterogeneous cloud computing environment, wherein the first edge device is stationary and the third edge device is moving;
    identifying a current location and a direction of travel of the third edge device;
    in response to determining the direction of travel is moving toward the first edge device, alerting both the first edge device and the third edge device;
    causing the first edge device to collect log data associated with the first edge device and to identify a relevant portion of the collected log data, wherein the relevant portion comprises latest log data of a latest day;
    causing the first edge device to transmit the relevant portion of the collected log data to the third edge device based on a lack of network connectivity between the first edge device and both a cloud data center and the second edge device, and also based on the direction of travel moving toward the first edge device;

causing the third edge device to transmit the collected log data to the second edge device based on the third edge device moving within a proximity of the second edge device; and receiving, at the cloud data center, the transmitted collected log data from the second edge device.

2. The method of claim 1, wherein the collected log data is caused to be transmitted from the first edge device to the second edge device based on the first edge device or the second edge device moving from a first location to a second location.

3. The method of claim 2, further comprising causing the first edge device to change a mode of operation based on the first edge device being within a connectivity range to the second edge device.

4. The method of claim 1, further comprising:
transmitting the identified relevant portion of the collected log data to the cloud data center or the second edge device; and
retaining a remaining portion of the collected log data for transmission at a later time.

5. The method of claim 1, wherein the first edge device is a far edge device and the second edge device is a near edge device.

6. The method of claim 1, wherein the first edge device and the second edge device correspond to one or more from among a mobile device, a smartphone, a personal computer, a tablet computer, an Internet of Things device, and a motor vehicle.

7. A computer system for smart log shipping in a heterogeneous computing environment, the computer system comprising:
one or more computer-readable storage media configured to store computer program code; and
one or more computer processors configured to access said computer program code and operate as instructed by said computer program code, said computer program code including:
identifying code configured to cause the one or more computer processors to identify a first edge device, a second edge device, and a third edge device in a heterogeneous cloud computing environment, wherein the first edge device is stationary and the third edge device is moving;
identifying code configured to cause the one or more computer processors to identify a current location and a direction of travel of the third edge device;
in response to determining the direction of travel is moving toward the first edge device, code configured to cause the one or more computer processors to alert both the first edge device and the third edge device;
code configured to cause the first edge device to collect log data associated with the first edge device and to identify a relevant portion of the collected log data, wherein the relevant portion comprises latest log data of a latest day;
transmitting code configured to cause the one or more computer processors to cause the first edge device to transmit the relevant portion of the collected log data to the third edge device based on a lack of network connectivity between the first edge device and both a cloud data center and the second edge device, and also based on the direction of travel moving toward the first edge device;

transmitting code configured to cause the one or more computer processors to cause the third edge device to transmit the collected log data to the second edge device based on the third edge device moving within a proximity of the second edge device; and receiving code configured to cause the one or more computer processors to receive, at the cloud data center, the transmitted collected log data from the second edge device.

8. The computer system of claim 7, wherein the collected log data is caused to be transmitted from the first edge device to the second edge device based on the first edge device or the second edge device moving from a first location to a second location.

9. The computer system of claim 8, further comprising changing code stored on the one or more computer-readable storage media, the changing code configured to cause the one or more computer processors to cause the first edge device to change a mode of operation based on the first edge device being within a connectivity range to the second edge device.

10. The computer system of claim 7, further comprising second transmitting code stored on the one or more computer-readable storage media, the second transmitting code configured to cause the one or more computer processors to:
transmit the identified relevant portion of the collected log data to the cloud data center or the second edge device; and
retaining a remaining portion of the collected log data for transmission at a later time.

11. The computer system of claim 7, wherein the first edge device is a far edge device and the second edge device is a near edge device.

12. The computer system of claim 7, wherein the first edge device and the second edge device correspond to one or more from among a mobile device, a smartphone, a personal computer, a tablet computer, an Internet of Things device, and a motor vehicle.

13. A computer program product for smart log shipping in a heterogeneous computing environment, comprising:
one or more computer-readable storage medium; and
program instructions stored on at least one of the one or more computer-readable storage medium, the program instructions configured to cause one or more computer processors to:
identify a first edge device, a second edge device, and a third edge device in a heterogeneous cloud computing environment, wherein the first edge device is stationary and the third edge device is moving;
identify a current location and a direction of travel of the third edge device;
in response to determining the direction of travel is moving toward the first edge device, alerting both the first edge device and the third edge device;
cause the first edge device to collect log data associated with the first edge device and to identify a relevant portion of the collected log data, wherein the relevant portion comprises latest log data of a latest day;
cause the first edge device to transmit the relevant portion of the collected log data to the third edge device based on a lack of network connectivity between the first edge device and both a cloud data center and the second edge device, and also based on the direction of travel moving toward the first edge device;

cause the third edge device to transmit the collected log data to the second edge device based on the third edge device moving within a proximity of the second edge device; and receive, at the cloud data center, the transmitted collected log data from the second edge device.

14. The computer program product of claim 13, wherein the collected log data is caused to be transmitted from the first edge device to the second edge device based on the first edge device or the second edge device moving from a first location to a second location.

15. The computer program product of claim 14, wherein the program instructions stored on the at least one of the one or more computer-readable storage medium are further configured to cause the one or more computer processors to cause the first edge device to change a mode of operation based on the first edge device being within a connectivity range to the second edge device.

16. The computer program product of claim 13, wherein the program instructions stored on the at least one of the one or more computer-readable storage medium are further configured to cause the one or more computer processors to:

transmit the identified relevant portion of the collected log data to the cloud data center or the second edge device; and retain a remaining portion of the collected log data for transmission at a later time.

17. The computer program product of claim 13, wherein the first edge device is a far edge device and the second edge device is a near edge device.

* * * * *